(12) United States Patent
Al-Aqeeli et al.

(10) Patent No.: US 11,712,874 B2
(45) Date of Patent: Aug. 1, 2023

(54) METAL COMPOSITE, A BIOCOMPATIBLE IMPLANT THEREOF AND METHODS OF FABRICATING THEREOF

(71) Applicant: KING FAHD UNIVERSITY OF PETROLEUM AND MINERALS, Dhahran (SA)

(72) Inventors: Nasser Al-Aqeeli, Dhahran (SA); Farzad Jalilian, Montreal (CA); Guillermo Mendoza-Suarez, Beaconsfield (CA); Muhammad Hussein, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 304 days.

(21) Appl. No.: 15/729,780

(22) Filed: Oct. 11, 2017

(65) Prior Publication Data

US 2019/0105876 A1     Apr. 11, 2019

(51) Int. Cl.
*B32B 15/01*     (2006.01)
*B22F 9/04*     (2006.01)
(Continued)

(52) U.S. Cl.
CPC .............. *B32B 15/01* (2013.01); *B22F 7/06* (2013.01); *B22F 9/04* (2013.01); *B22F 10/25* (2021.01); *B22F 10/34* (2021.01); *B33Y 70/00* (2014.12); *B33Y 70/10* (2020.01); *C22C 1/0458* (2013.01); *C22C 14/00* (2013.01); *B22F 10/32* (2021.01); *B22F 10/36* (2021.01); *B22F 10/38* (2021.01); *B22F 12/43* (2021.01); *B22F 2009/041* (2013.01); *B22F 2009/043* (2013.01);

(Continued)

(58) Field of Classification Search
None
See application file for complete search history.

(56) References Cited

U.S. PATENT DOCUMENTS

| | | | | |
|---|---|---|---|---|
| 5,477,864 A | * | 12/1995 | Davidson | ............... A61B 17/72 600/585 |
| 2017/0071744 A1 | | 3/2017 | Bali et al. | |
| 2018/0016669 A1 | * | 1/2018 | Fisk | ....................... A61L 31/022 |

FOREIGN PATENT DOCUMENTS

| | | |
|---|---|---|
| CN | 1709521 A | 12/2005 |
| CN | 104857566 A | 8/2015 |

(Continued)

OTHER PUBLICATIONS

Markhoff, J., et al., "Influence of Different Grained Powders and Pellets Made of Niobium and Ti-42Nb on Human Cell Viability", Materials Science and Engineering C, vol. 73, pp. 756-766 (Dec. 24, 2016).

(Continued)

*Primary Examiner* — Elizabeth Collister
(74) *Attorney, Agent, or Firm* — Oblon, McClelland, Maier & Neustadt, L.L.P.

(57) ABSTRACT

A metal composite that includes a core comprising titanium, zirconium, and niobium, and a shell comprising titanium, zirconium, and niobium, wherein the shell covers at least a portion of the core; and a method of fabricating the metal composite by mechanically alloying and 3D printing a metal powder comprising titanium, niobium, and zirconium. Various embodiments of the metal composite and the method of fabricating the same are also provided.

13 Claims, 1 Drawing Sheet

(51) Int. Cl.
  *B22F 7/06* (2006.01)
  *C22C 14/00* (2006.01)
  *C22C 1/04* (2023.01)
  *B33Y 70/10* (2020.01)
  *B22F 10/38* (2021.01)
  *B33Y 70/00* (2020.01)
  *B22F 10/25* (2021.01)
  *B22F 10/34* (2021.01)
  *B33Y 10/00* (2015.01)
  *B22F 12/43* (2021.01)
  *B22F 10/32* (2021.01)
  *B22F 10/36* (2021.01)

(52) U.S. Cl.
  CPC ....... *B22F 2998/10* (2013.01); *B32B 2250/02* (2013.01); *B32B 2311/18* (2013.01); *B33Y 10/00* (2014.12)

(56) References Cited

FOREIGN PATENT DOCUMENTS

| KR | 10-1633660 B1 | 6/2016 |
|----|---------------|--------|
| WO | 2006/116752 A2 | 11/2006 |

OTHER PUBLICATIONS

ASTM F1713-08(2013), "Standard Specification for Wrought Titanium-13Niobium-13Zirconium Alloy for Surgical Implant Applications (UNS R58130)", URL: https://www.astm.org/Standards/F1713.htm, ASTM International, vol. 13.01, 4 Pages total, (Aug. 2013) (Abstract only).

Barbinta, A.C., et al., "Metallographic Characterization of a New Biomedical Titanium-Based Alloy for Orthopedic Applications", URL: http://webbut.unitbv.ro/BU2013/Series%20I/BULETIN%20I%20PDF/Barbinta_AC_2.pdf. Bulletin of The Transilvania University of Brasov, vol. 6 (55), No. 1, (2013).

Petrovic, V., et al., "Additive Manufacturing Solutions for Improved Medical Implants", URL: http://cdn.intechopen.com/pdfs/33119.pdf, Intechopen, pp. 147-181, (Mar. 21, 2012).

Mantripragada, V.P., et al., "An Overview of Recent Advances in Designing Orthopedic and Craniofacial Implants", Journal of Biomedical Materials Research Part A, vol. 101, No. 11, pp. 3349-3364, (Nov. 2013).

Hussein, M.A., et al., "Fabrication of Nano-Grained Ti—Nb—Zr Biomaterials using Spark Plasma Sintering", Materials and Design, vol. 87, pp. 693-700, (Aug. 20, 2015).

* cited by examiner

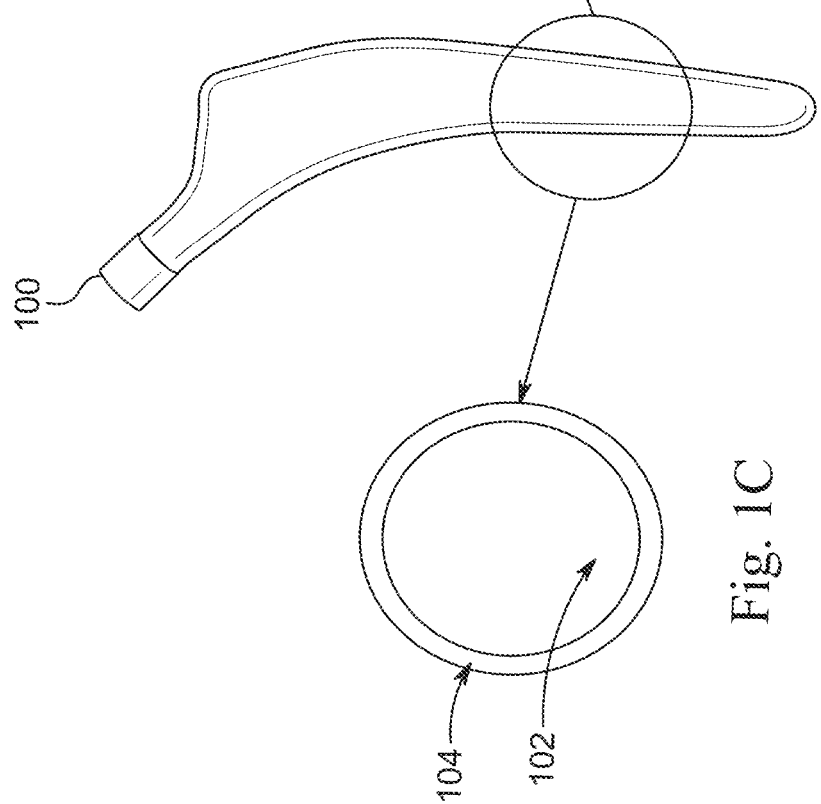
Fig. 1A
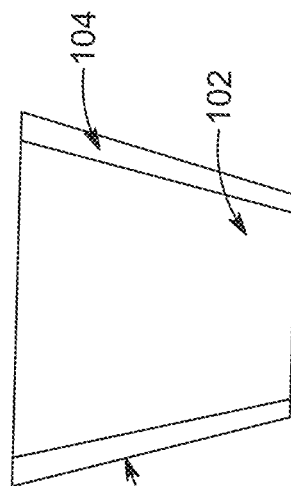
Fig. 1B
Fig. 1C

METAL COMPOSITE, A BIOCOMPATIBLE IMPLANT THEREOF AND METHODS OF FABRICATING THEREOF

BACKGROUND OF THE INVENTION

Technical Field

The present invention relates to a metal composite (or a biomaterial), a biocompatible implant made from the metal composite and methods of fabricating thereof, wherein the metal composite (or the biomaterial) includes a core comprising titanium, zirconium, and niobium, and a shell that covers at least a portion of the core.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mechanical alloying is a process of repeated fracturing and welding. Mechanical alloying is a widely used process to form alloys with unique compositions, morphologies and structures. Mechanical alloying is capable of producing dispersion strengthened alloys that are not producible by casting (due to high melting points), rapid solidification, or even conventional powder metallurgy techniques. The dispersion strengthened alloys that are formed by mechanical alloying exhibit significantly improved mechanical properties.

3D printing is a process of creating objects in a confined space using 3D printing machines. Generally, 3D printing machines utilize a layer-by-layer deposition method to deposit materials (in a form of powders or wires) to create objects that can be utilized in various applications. In biomedical applications, 3D printing technology aids to create tissue-like structures that mimic a specific shape and structure of an organ in a body. The tissue-like structures can be utilized in tissue-replacement surgeries, etc. In addition, 3D printing machines have begun to print scaffolds, which can be used to regenerate joints and ligaments.

In view of the forgoing, one objective of the present disclosure is to provide a metal composite (or a biomaterial for biomedical applications) that includes a core containing titanium, zirconium, and niobium, and a shell containing titanium, zirconium, and niobium, wherein the shell covers at least a portion of the core. Another aspect of the present disclosure relates to a method of fabricating the metal composite (or the biomaterial) that involves i) mechanically alloying a first metal powder containing titanium, niobium, and zirconium, and ii) printing a core of the metal composite with a 3D printing machine, followed by iii) printing a shell of the metal composite on the core using a second metal powder, which is not mechanically alloyed, thereby forming the metal composite (or the biomaterial).

BRIEF SUMMARY OF THE INVENTION

According to a first aspect, the present disclosure relates to a metal composite, including i) a core containing titanium, zirconium, and niobium, ii) a shell that covers at least a portion of the core, wherein the shell contains titanium, zirconium, and niobium, wherein a crystallinity of the core is at least 50 vol % relative to the total volume of the core, and wherein a crystallinity of the shell is no more than 10 vol % relative to the total volume of the shell.

In one embodiment, the metal composite is biocompatible.

In one embodiment, the crystallinity of the core is in the range of 60 vol % to 99.9 vol %, relative to the total volume of the core.

In one embodiment, the crystallinity of the shell is no more than 1.0 vol %, relative to the total volume of the shell.

In one embodiment, the core comprises a 10-30% atomic percentage of niobium, a 5-20% atomic percentage of zirconium, and a 60-75% atomic percentage of titanium, relative to the total number of atoms of the core.

In one embodiment, the shell comprises a 10-30% atomic percentage of niobium, a 5-20% atomic percentage of zirconium, and a 60-75% atomic percentage of titanium, relative to the total number of atoms of the shell.

In one embodiment, the shell has a thickness of no more than 1 cm.

In one embodiment, titanium, zirconium, and niobium are homogenously dispersed in the core, and titanium, zirconium, and niobium arc homogenously dispersed in the shell.

In one embodiment, the core further includes at least one ceramic material selected from the group consisting of titanium nitride (TN), titanium carbide (TiC), zirconia, silica, silicon carbide, silicon nitride, alumina, aluminum nitride, aluminum titanate, and tungsten carbide, and the shell further includes one or more of titanium oxide, zirconia, and niobium oxide.

In one embodiment, the metal composite has at least one of the following properties, i) an elastic modulus of the core that is at least 50% higher than the elastic modulus of the shell, ii) a hardness of the core that is at least 50% higher than the hardness of the shell, and i) a ductility of the shell that is at least 50% higher than the ductility of the core.

In one embodiment, the crystallinity of the core and the crystallinity of the shell is determined by X-ray diffraction.

According to a second aspect, the present disclosure relates to a method of fabricating a metal composite, involving i) mechanically alloying a first metal powder comprising titanium, niobium, and zirconium to form a printing precursor powder, ii) feeding the printing precursor powder into a 3D printing machine and printing a core of the metal composite, iii) feeding a second metal precursor comprising titanium, niobium, and zirconium into the 3D printing machine and printing a shell that covers at least a portion of the core thereby fabricating the metal composite.

In one embodiment, a crystallinity of the printing precursor powder is at least 20 vol %.

In one embodiment, a crystallinity of the second metal powder is no more than 10 vol %.

In one embodiment, the first metal powder comprises a 10-30% atomic percentage of niobium, a 5-20% atomic percentage of zirconium, and a 60-75% atomic percentage of titanium, relative to the total number of atoms of the first metal powder, and the second metal powder comprises a 10-30% atomic percentage of niobium, a 5-20% atomic percentage of zirconium, and a 60-75% atomic percentage of titanium, relative to the total number of atoms of the second metal powder.

In one embodiment, the first metal powder does not include a process control agent.

In one embodiment, the first metal powder is mechanically alloyed under an inert atmosphere.

In one embodiment, the first metal powder is mechanically alloyed in a planetary ball mill at a temperature of 10 to 40° C. for 5 to 60 hours at a rotational speed of 100 to 600 RPM.

In one embodiment, the planetary ball mill comprises ceramic vials and ceramic balls of at least one ceramic material selected from the group consisting of tungsten carbide, alumina, and zirconia.

In one embodiment, a weight ratio of the ceramic balls to the first metal powder is in a range of 1:1 to 50:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a schematic representation of a biomaterial with a core and a shell.

FIG. 1B is a lateral cross-sectional view of the biomaterial.

FIG. 1C is a top cross-sectional view of the biomaterial.

DETAILED DESCRIPTION OF THE EMBODIMENTS

Referring now to the drawings, wherein like reference numerals designate identical or corresponding parts throughout the several views.

According to a first aspect, the present disclosure relates to a metal composite. The term "metal composite" as used herein refers to a core-shell metallic structure having a core surrounded by a shell, wherein the shell covers at least a portion of the core, and wherein each of the core and the shell is a metal alloy containing a plurality of metallic elements. Due to the presence of the metal alloy in the core and the shell, the metal composite may have a higher mechanical strength, a higher wear resistance, and a higher corrosion resistance than a metal composite that does not include metal alloys in the core and/or in the shell or than the metal alloys individually.

Depending on applications of the metal composite, the shell may cover at least 10%, or at least 20%, or at least 30%, or at least 40%, or at least 50%, or at least 60%, or at least 70%, or at least 80%, or at least 90%, or at least 95%, or at least 99% of the external surface area of the core. Also, the core has a crystallinity of at least 50 vol %, preferably in the range of 60 vol % to 99.9 vol %, more preferably in the range of 70 vol % to about 90 vol %, relative to the total volume of the core. The crystallinity of the core is different than the crystallinity of the shell, which is no more than 10 vol %, preferably no more than 5.0 vol %, preferably no more than 1.0 vol %, relative to the total volume of the shell. Preferably, the crystallinity is a determining factor that differentiates the core from the shell. The crystallinity of the core and the shell of the metal composite may be determined by any method known in the art, preferably by X-ray diffraction. Accordingly, the statement "the crystallinity of the core is in the range of 70 vol % to 90 vol %", refers to the embodiments, wherein 70% to 90% by volume of the core includes a metal alloy (e.g. an alloy of titanium, zirconium, and niobium) that is in a crystalline phase, which is detectable by X-ray diffraction, where 0% means none of the metal alloy is in the crystalline phase and 100% means all of the metal alloy is in the crystalline phase. Having a core-shell structure of the metal composite may be advantageous because the core provides rigidity, strength, hardness, and stiffness to the metal composite due to a higher crystallinity compared to the shell, whereas the shell may provide the composite with improved workability such that the metal composite can be reshaped to a predetermined shape and geometry due to a lower crystallinity compared to the crystallinity of the core.

In some embodiments, a border between the core and the shell is detectable with naked eyes. In some other embodiments, the border between the core and the shell may not be detectable with naked eyes, and advance equipment, e.g. crystallinity measurement equipment such as XRD or XRF or density measurement equipment or microscopy instruments such as SEM may be needed to distinguish the core from the shell. Accordingly, in one embodiment, the shell has a thickness of no more than 1 cm, preferably in the range from about 0.05 to about 1.0 cm, preferably from about 0.1 to about 0.9 cm, preferably from about 0.2 to about 0.8 cm, preferably from about 0.3 to about 0.7 cm, preferably from about 0.4 to about 0.6 cm.

The core of the metal composite includes titanium, zirconium, and niobium. In some embodiments, the core includes 10% to 30%, preferably 12% to 28%, preferably 15% to 25%, preferably 18% to 22%, preferably about 20% atomic percentage of niobium, relative to the total number of atoms in the core. In addition, the core includes 5% to 20%, preferably 8% to 18%, preferably 10% to 15%, preferably about 13% atomic percentage of zirconium, relative to the total number of atoms in the core. The core further includes 60% to 75%, preferably 62% to 72%, preferably 65% to 70%, preferably about 67% atomic percentage of titanium, relative to the total number of atoms in the core. Intermetallic bonds may be present between titanium, zirconium, and niobium at phase boundaries (i.e. at boundaries where titanium, zirconium, and niobium particles meet). The core of the metal composite may further include nickel, cobalt, a refractory element, or combinations thereof. As used herein, the term "refractory element" refers to an element selected from the group consisting of molybdenum, tantalum, tungsten, rhenium, vanadium, chromium, hafnium, ruthenium, osmium, and iridium. An atomic percentage of nickel, cobalt, and the refractory elements when present may preferably be no more than 20%, preferably no more than 15%, preferably no more than 10%, preferably no more than 5%, preferably no more than 1%, preferably no more than 0.1%, relative to the total number of atoms in the core.

Metal elements present in the core (i.e. titanium, zirconium, and niobium as well as the optional nickel, cobalt, and the refractory elements) may preferably be in a form of composite particles with an average particle size of less than 10 μm, preferably less than 5 μm, preferably less than 2 μm, preferably less than 1 μm, preferably in the range of 1-500 nm, preferably 10-200 nm, more preferably 20-100 nm. Alternatively, the metal elements present in the core may be in a form of agglomerates (i.e. aggregates of the composite particles) with an average size of less than 200 μm, preferably less than 100 μm, preferably less than 50 μm, preferably less than 20 μm, preferably less than 10 μm.

In one embodiment, titanium, zirconium, and niobium are homogenously dispersed in the core. The statement "titanium is homogenously dispersed in the core" refers to embodiments wherein a volumetric concentration of titanium in any cubic-micron (1 μm$^3$) of the core differs by no more than 10%, preferably no more than 5%, preferably no more than 1% of the volumetric concentration of titanium of another cubic-micron (1 μm$^3$) of the core. Accordingly, the term "homogenously dispersed in the core" as used herein refers to embodiments wherein a volumetric concentration of titanium, zirconium, and niobium (or any other metal elements that may also be present in the core) in any cubic-micron (1 μm$^3$) of the core differs by no more than 10%, preferably no more than 5%, preferably no more than 1% of the volumetric concentration of titanium, zirconium, and niobium (or any other metal elements that may also be present in the core) of another cubic-micron (1 μm$^3$) of the core.

The core may further include at least one ceramic material such as a metal carbide, metal nitride and/or metal oxide preferably selected from the group consisting of titanium nitride, titanium carbide, zirconia, silica, silicon carbide, silicon nitride, alumina, aluminum nitride, aluminum titanate, and tungsten carbide. The core may also include one or more ceramic materials including, for example, barium ferrite, barium zirconate, boron carbide, boron nitride, zinc oxide, tungsten oxide, zinc titanate, antimony tin oxide, cerium oxide, barium titanate, bismuth cobalt zinc oxide, bismuth oxide, calcium oxide, calcium titanate, calcium zirconate, cerium zirconium oxide, chromium oxide, cobalt oxide, copper iron oxide, copper oxide, copper zinc iron oxide, dysprosium oxide, erbium oxide, europium oxide, gadolinium oxide, holmium oxide, indium hydroxide, indium oxide, indium tin oxide, iron nickel oxide, iron oxide, lanthanum oxide, lithium titanate, magnesium aluminate, magnesium hydroxide, magnesium oxide, manganese oxide, molybdenum oxide, neodymium oxide, nickel cobalt oxide, nickel oxide, nickel zinc iron oxide, samarium oxide, samarium strontium cobalt oxide, strontium ferrite, strontium titanate, terbium oxide, tin oxide, titanium carbide, titanium carbonitride, ytterbium oxide, yttrium oxide, yttrium aluminum oxide, yttrium iron oxide, and zinc iron oxide. A volume percentage of the ceramic materials present in the core may preferably be no more than 5.0 vol %), preferably no more than 2.0 vol %, preferably no more than 1.0 vol %, preferably no more than 0.5 vol %, relative to the total volume of the core. The ceramic materials may have an average particle size of no more than 10 μm, preferably no more than 5 μm, preferably no more than 2 μm, preferably no more than 1 μm, preferably in the range of 1-500 nm, preferably in the range of 10-200 nm, more preferably in the range of 20-100 nm. The presence of the ceramic materials may improve rigidity, hardness, and mechanical strength of the core.

The shell of the metal composite includes titanium, zirconium, and niobium. In some embodiments, the shell includes 10% to 30%, preferably 12% to 28%, preferably 15% to 25%, preferably 18% to 22%, preferably about 20% atomic percentage of niobium, relative to the total number of atoms in the shell. In addition, the shell includes 5% to 20%, preferably 8% to 18%, preferably 10% to 15%, preferably about 13% atomic percentage of zirconium, relative to the total number of atoms in the shell. The shell further includes 60% to 75%, preferably 62% to 72%, preferably 65% to 70%, preferably about 67% atomic percentage of titanium, relative to the total number of atoms in the shell. Intermetallic bonds may preferably not be present between titanium, zirconium, and niobium at phase boundaries (i.e. at boundaries where titanium, zirconium, and niobium particles meet). In one embodiment, the shell contains one or more of titanium oxide, zirconia, and niobium oxide.

In addition to titanium, zirconium, and niobium, the shell may further include at least one biocompatible element selected from the group consisting of cobalt, chromium, tantalum, iron, molybdenum, tin, and silicon. Preferably, the at least one biocompatible element is not cytotoxic. An atomic percentage of the at least one biocompatible elements when present may be no more than 20%, preferably no more than 15%, preferably no more than 10%, preferably no more than 5%, relative to the total number of atoms in the shell.

In one embodiment, titanium, zirconium, and niobium are homogenously dispersed in the shell. The statement "titanium is homogenously dispersed in the shell" refers to embodiments wherein a volumetric concentration of titanium in any cubic-micron (1) of the shell differs by no more than 10%, preferably no more than 5%, preferably no more than 1% of the volumetric concentration of titanium of another cubic-micron (1 μm$^3$) of the shell. Accordingly, the term "homogenously dispersed in the shell" as used herein refers to embodiments wherein a volumetric concentration of titanium, zirconium, and niobium (or the biocompatible elements that may also be present in the shell) in any cubic-micron (1 μm$^3$) of the shell differs by no more than 10%, preferably no more than 5%, preferably no more than 1% of the volumetric concentration of titanium, zirconium, and niobium (or the biocompatible elements that may also be present in the shell) of another cubic-micron (1 μm$^3$) of the shell.

In some preferred embodiments, mechanical properties (e.g. elastic modulus, hardness, ductility, etc.) of the core are different that the mechanical properties of the shell due to a difference between the crystallinity of the core and the crystallinity of the shell. Accordingly, in one embodiment, an elastic modulus of the core is at least 50%, preferably at least 60%, preferably at least 70%, preferably at least 80%, preferably at least 90% higher than the elastic modulus of the shell. The term "elastic modulus" as used herein refers to a resistance of the core or the shell from elastic deformation when being exposed to a mechanical stress, at a temperature in the range of 20 to 30° C., preferably 22 to 28° C., preferably about 25° C. The elastic modulus of the core and/or the shell may be measured with a load-displacement measurement, for example via ASTM E111, or a dynamic mechanical analysis approach. In another embodiment, a hardness (or Vickers hardness) of the core is at least 50%, preferably at least 60%, preferably at least 70%, preferably at least 80%, preferably at least 90% higher than the hardness of the shell. As used herein, the term "hardness" refers to a measure of a resistance of the core or the shell to permanent shape change when exposed to a compressive stress, at a temperature in the range of 20 to 30° C., preferably 22 to 28° C., preferably about 25° C. The hardness (or Vickers hardness) of the core and the shell may be measured via ASTM E92. Yet in another embodiment, a ductility of the shell is at least 50%, preferably at least 60%, preferably at least 70%, preferably at least 80%, preferably at least 90% higher than the ductility of the core. The term "ductility" as used herein refers to a measure of an ability of the core or the shell to deform under tensile stress, at a temperature in the range of 20 to 30° C., preferably 22 to 28° C., preferably about 25° C. The ductility of the core and the shell may be measured via ASTM E290. Yet in another embodiment, a malleability of the shell is at least 50%, preferably at least 60%, preferably at least 70%, preferably at least 80%, preferably at least 90% higher than the malleability of the core. The term "malleability" as used herein refers to a measure of an ability of the core or the shell to deform under compressive stress, at a temperature in the range of 20 to 30° C., preferably 22 to 28° C., preferably about 25° C. The malleability of the core and the shell may be measured via ASTM E9. In view of that, the core may provide rigidity (due to a higher elastic modulus) and mechanical strength to the metal composite, whereas the shell may facilitate a process of machining or reshaping the metal composite, e.g. forging, extruding, rolling, hammering, etc. (due to a higher malleability and ductility).

In one embodiment, the core contains grains, wherein an average size of grains in the core is in the range of 1-10 μm, preferably 2-5 μm, more preferably about 3-4 μm. The shell may or may not contain grains. In one embodiment, the shell contains grains, wherein an average size of grains in the shell may be in the range of 10-20 μm, preferably 12-18 μm, more preferably about 14-16 μm.

In some embodiments, a porosity of the shell is at least two times, preferably at least three times larger than the porosity of the core. For example, the porosity of the shell may be in the range of 0.5-15.0 vol %, preferably 5.0-12.0 vol %, preferably 8.0-10.0 vol %, relative to the total volume of the shell, whereas the porosity of the core may be in the range of 0.5-5.0 vol %, preferably 1.0-2.5 vol %, preferably 1.5-2.0 vol %, relative to the total volume of the core. The term "porosity" as used herein refers to a measure of void (or empty) spaces in the core and in the shell, at a temperature in the range of 20 to 30° C., preferably 22 to 28° C., preferably about 25° C. The porosity of the core and the shell may be determined by a density measurement approach, positron annihilation light spectroscopy, etc. In a preferred embodiment, a porosity of the shell can be adjusted and therefore the elastic modulus of the shell can be adjusted accordingly, wherein the elastic modulus of the shell is substantially the same as an elastic modulus of a material or a hard tissue, e.g. a bone, which is directly adjacent to the shell. In addition, an average pore size in the core may vary in the range of 1 to 600 μm, preferably 10 to 400 μm, preferably 50 to 200 μm, preferably about 100 μm, whereas an average pore size in the shell may vary in the range of 1 to 800 μm, preferably 100 to 600 μm, preferably 200 to 500 μm, preferably 300 to 400 μm. In one embodiment, the porosity of the core and the shell is determined via ASTM B809.

Yet in some other embodiments, a relative density of the core is at least 5%, preferably at least 10% larger than the relative density of the shell. For example, the relative density of the core may be in the range of 90-99.9%, preferably 92-98%, preferably 95-97%, whereas the relative density of the shell may be in the range of 85-95%, preferably 88-92%, preferably about 90%. The term "relative density" as used herein refers to a ratio of the density of the core (or the shell) to the density of a solid core (or a solid shell) that does not contain voids, at a temperature in the range of 20 to 30° C., preferably 22 to 28° C., preferably about 25° C. The relative density of the core and the shell may be determined by a water displacement method, or a density gradient column method.

The metal composite may be utilized in various applications, including for example car manufacturing, aerospace, electronics, food, pharmaceutical, medical and sport goods. Depending on the application of the metal composite, further processing steps may be necessary. For example, the metal composite may be forged to a desired shape, and may further be polished, coated, e.g. with coloring dyes, and/or hardened to be utilized in car manufacturing and/or aerospace industries. Alternatively, the metal composite may be wrought to a desired shape, and may optionally be coated with a coating material (e.g. epoxy, polyurethane, etc.) to be utilized as sport goods or utensils, wherein the coating material may preserve the metal composite from surface oxidation and corrosion.

In the most preferred embodiment, the metal composite is biocompatible, and the metal composite is reshaped to a predetermined shape and geometries (may also referred to as a biomaterial in this disclosure) for biomedical applications. Exemplary biomedical applications for the metal composite (or the biomaterial) may include but are not limited to, hard tissue joint replacements (e.g. hip joints, knee joints, shoulder and elbow joints, etc.), bone plates, bone scaffolds, dental scaffolds (e.g. crowns, dentures, implants, etc.), stents, and orthopedic surgical tools (e.g. sutures, clips, staples, pins, screws, etc.). The term "biocompatible" as used herein refers to a property of the metal composite for being biologically compatible with an adjoining tissue and without causing harm. In some embodiments, biocompatibility of the metal composite is determined via one or more of ASTM F1223, ASTM F1357, ASTM F1378, ASTM F1672, ASTM F1714, ASTM F1781, ASTM F2068, and ASTM F1814.

In a preferred embodiment, the biomaterial is a femoral stem 100 with a core 102 and a shell 104, as shown in FIGS. 1A, 1B, and 1C which is utilized in a hip replacement surgery as a hip prosthesis. The presence of titanium, zirconium, and niobium may promote osseointegration of the femoral stem 100 with a hard tissue, e.g. a bone, which is directly adjacent to the femoral stem. In addition, the presence of the at least one biocompatible element may also promote osseointegration of the femoral stem with the adjoining hard tissue, i.e. the hard tissue that is directly adjacent to the femoral stem.

In some embodiments, the biomaterial is fabricated with a 3D printing machine, wherein the porosity of the shell may be altered, for example by increasing a feeding rate of a powder to the 3D printing machine or by increasing a pitch size between deposition tracks during 3D printing. In view of that, the elastic modulus and the relative density of the shell can be adjusted. Therefore, a biomaterial may be fabricated with a porosity that is substantially the same as a porosity of a hard tissue, e.g. a bone, which is directly adjacent to the biomaterial. In addition, a biomaterial may be fabricated that has an elastic modulus and/or a relative density that is substantially the same as an elastic modulus and/or a relative density of a hard tissue, e.g. a bone, which is directly adjacent to the biomaterial. In the embodiments where the elastic modulus of the biomaterial is substantially the same as the elastic modulus of an adjoining hard tissue, a stress shielding effect may be reduced and thus an applied stress may be evenly transferred and uniformly distributed in the biomaterial, which may prolong a life span of the biomaterial. The term "substantially the same" as used in this disclosure refers to the embodiments where a difference in a physical quantity of the biomaterial and an adjoining hard tissue, i.e. a hard tissue which is directly adjacent to the biomaterial, is no more than 10%, preferably no more than 5%, preferably no more than 2%. For example, the statement "the biomaterial has a porosity that is substantially the same as the porosity of the hard tissue" refers to an embodiment, wherein a difference in the porosity of the biomaterial and an adjoining hard tissue is no more than 10%, preferably no more than 5%, preferably no more than 2%.

According to a second aspect, the present disclosure relates to a method of fabricating the metal composite, in one or more of its embodiments. According to the method, the metal composite can be fabricated to a predetermined shape and geometries, which may be designed by a computer-aided design software or may be prepared by a 3D scanner.

The method involves mechanically alloying a first metal powder comprising titanium, niobium, and zirconium to form a printing precursor powder. The term "mechanical alloying" as used herein refers to a solid-state powder processing that involves repeated cold welding, fracturing, and re-welding of blended metal powder particles to produce composite metal particles.

In one embodiment, the first metal powder includes 10% to 30%, preferably 12% to 28%, preferably 15% to 25%, preferably 18% to 22%, preferably about 20% atomic percentage of niobium, relative to the total number of atoms in the first metal powder. In addition, the first metal powder includes 5% to 20%, preferably 8% to 18%, preferably 10% to 15%, preferably about 13% atomic percentage of zirconium, relative to the total number of atoms in the first metal powder. The first metal powder further includes 60% to 75%, preferably 62% to 72%, preferably 65% to 70%, preferably about 67% atomic percentage of titanium, relative to the total number of atoms in the first metal powder. Mechanical alloying the first metal powder may preferably form composite metal particles of Ti/Zr/Nb with intermetallic bonds therebetween. A crystallinity of the first metal powder before mechanical alloying may be no more than 10 vol %, preferably no more than 5 vol %, preferably no more than 1 vol %, relative to the total volume of the first metal powder. However, the crystallinity of the first metal powder after mechanical alloying (i.e. the crystallinity of the printing precursor powder) is at least 20 vol %, preferably at least 30 vol %, preferably at least 40 vol %, preferably at least 50 vol %, preferably at least 60 vol %, preferably at least 70 vol %, relative to the total volume of the first metal powder.

Mechanical alloying the first metal powder may produce a crystalline phase with a crystallinity of at least 20 vol % in the first metal powder. The presence of the crystalline phase in the first metal powder may assist further crystallization in subsequent 3D printing steps. In contrast, the absence of the crystalline phase with a crystallinity of at least 20 vol % in the first metal powder may not cause further crystallization in subsequent 3D printing steps. Therefore, the first metal powder is mechanically alloyed until a crystalline phase with a crystallinity of at least 20 vol % is achieved in the first metal powder before 3D printing.

In some embodiments, the first metal powder is mechanically alloyed under an inert atmosphere. For example, the first metal powder may be mechanically alloyed under vacuum, i.e. at a pressure of no more than 0.2 atm, preferably no more than 0.1 atm, Preferably, the first metal powder may be mechanically alloyed in an atmosphere filled with an inert gas, e.g. nitrogen, preferably helium, more preferably argon, or a combination thereof. In addition, the first metal powder may be mechanically alloyed in a planetary ball mill at a temperature of 10 to 40° C., preferably 15 to 35° C., preferably 20 to 30° C., preferably 22 to 28° C., preferably about 25° C., for 5 to 60 hours, preferably about 10 to 50 hours, preferably about 15 to 40 hours, with a rotational speed of 100 to 600 RPM, preferably 200 to 500 RPM, preferably 250 to 400 RPM, preferably about 300 RPM. In one embodiment, the planetary ball mill includes one or more ceramic vials and at least one ceramic ball in each vial, preferably at least five ceramic balls in each vial, preferably at least eight ceramic balls in each vial, preferably at least ten ceramic balls in each vial, but preferably no more than twenty ceramic balls in each vial. In a preferred embodiment, the one or more ceramic vials and the at least one ceramic ball are made of at least one ceramic material selected from the group consisting of tungsten carbide, alumina, and zirconia. Preferably, the ceramic vials and the ceramic balls are made of the at least one ceramic material, because mechanically alloying the first metal powder with metallic vials and/or metallic balls may contaminate the first metal powder with residual materials of the metallic vials and/or the metallic balls. In another preferred embodiment, a weight ratio of the ceramic balls to the first metal powder is in a range of 1:1 to 50:1, preferably 2:1 to 40:1, preferably 5:1 to 30:1, preferably 8:1 to 20:1, preferably about 10:1.

In a preferred embodiment, the first metal powder does not include a process control agent. However, in some embodiments, the first metal powder may be mechanically alloyed in the presence of a process control agent (PCA). The term "process control agent" as used herein refers to a component that may be present in the first metal powder that provides a lubricating effect and minimizes a cold-welding effect, and also controls re-welding and fracturing of powders during mechanical alloying. Without the process control agent the first metal powder may be agglomerated or may stick to the ceramic balls and vials, and therefore the first metal powder may not be milled efficiently. The PCA may be any organic material such as an organic acid (e.g. stearic acid), an alcohol, an alkane (e.g., heptane), an aldehyde, an ether, graphite flakes, and/or water. After mechanical alloying the first metal powder, the PCA may still be present in the printing precursor powder, and thus the PCA may be removed from the printing precursor powder by separation methods known in the art, e.g. centrifugation, evaporation, dissolution, purging with an inert gas such as argon, degassing, etc.

In some embodiments, titanium, niobium, and zirconium are mixed to form the first metal powder prior to the mechanical alloying. The optional mixing step may facilitate the mechanical alloying step. For example, in one embodiment, the first metal powder is mixed in a centrifugal mixer, without using a milling ball, with a rotational speed of in the range of 200 to 800 RPM, preferably 300 to 700 RPM, preferably 400 to 600 RPM, for at least 30 minutes, but no more than 2 hours, preferably no more than 1 hour. Titanium, niobium, and zirconium may preferably be mixed at a temperature in the range of 20 to 30° C., preferably 22 to 28° C., preferably about 25° C., although in some embodiments, titanium, niobium, and zirconium may be mixed at an elevated temperature of at least 40° C., or at least 60° C., or at least 100° C., but preferably no more than 150° C. Titanium, niobium, and zirconium may be mixed in a non-oxidizing environment (e.g. in an inert atmosphere comprising nitrogen, argon, helium, or a combination thereof).

The method further involves feeding the printing precursor powder into a 3D printing machine and printing the core of the metal composite (or the biomaterial). The 3D printing machine, which is utilized to fabricate the metal composite, may be equipped with at least a base plate that is mounted on a Computer Numerical Control (CNC) table, a vacuum chamber that encloses the base table, and an energy source that is mounted on the CNC table.

In view of that, printing the core of the metal composite (or the biomaterial) may involve several processing steps as following. In a first step, the vacuum chamber is evacuated, wherein oxygen content in the vacuum chamber reduces to a value less than 10 ppm, preferably less than 5 ppm, and preferably less than 1 ppm, to eliminate a chance of surface oxidation of the metal composite (or the biomaterial). In a second step, the energy source, which may be a pulsed laser, a fiber laser, an electron-beam, or a micro-plasma torch, creates a melt pool on the base plate for a deposition of the metal composite. Depending on the type of the energy source, a power of the energy source may vary in the range of 1 to 600 kW, preferably 2 to 500 kW. For example, in one embodiment, the energy source is a plasma torch with a power in the range of 0.5 to 5 kW, preferably 1 to 2 kW. Or, in another embodiment, the energy source is a fiber laser with a power in the range of 100 to 600 kW, preferably 200 to 500 W. In an alternative embodiment, the energy source is a fiber laser with a power in the range of 10 to 20 kW, preferably 12 to 15 kW. In a third step, the printing precursor powder is fed into the energy source of the 3D printing machine, wherein the energy source melts the printing precursor powder, and a molten printing powder is further deposited layer-by-layer on the base plate. The molten printing powder may solidify in the melt pool of the base plate. A movement of the CNC table may be controlled by a computer and the molten printing powder is deposited until the core with a desired shape and geometries is fabricated. The molten printing powder may be deposited with a deposition rate in the range of 50 to 1,500 g/hr (grams per hour), preferably 100 to 1,000 g/hr, preferably 150 to 500 g/hr. In some embodiments, one or more printing process variables such as the power of the energy source, a feed rate of the printing precursor powder into the energy source, a speed of the CNC table, and a distance between deposition tracks may vary depending on a desired porosity and a desired elastic modulus of the core of the metal composite. In a preferred embodiment, the one or more printing process variables are selected such that the porosity of the core is in the range of 0.5-5.0 vol %, preferably 1.0-2.5 vol %, preferably 1.5-2.0 vol %, relative to the total volume of the core.

A damaged hard tissue, e.g. a bone, may first be scanned with a Computer Tomography (CT) scanning, or other means known to those in the art, and scanned images may further be utilized for 3D printing. Accordingly, in one embodiment, a CT scan image may be converted to a standard template library (or STL) file that can be read by the 3D printing machine. In one embodiment, the STL file is first modified by a computer-aided design software, e.g. CATIA™ or SolidWorks™, before printing. In another embodiment, the biomaterial is designed with the computer-aided design software, and is printed thereafter.

The method further involves feeding a second metal precursor comprising titanium, niobium, and zirconium into the 3D printing machine and printing the shell that covers at least a portion of the core that is printed.

In a preferred embodiment, a composition of the second metal powder is substantially the same as the composition of the first metal powder. In some embodiments, the second metal powder includes 10% to 30%, preferably 12% to 28%, preferably 15% to 25%, preferably 18% to 22%, preferably about 20% atomic percentage of niobium, relative to the total number of atoms in the second metal powder. In addition, the second metal powder includes 5% to 20%, preferably 8% to 18%, preferably 10% to 15%, preferably about 13% atomic percentage of zirconium, relative to the total number of atoms in the second metal powder. The second metal powder further includes 60% to 75%, preferably 62% to 72%, preferably 65% to 70%, preferably about 67% atomic percentage of titanium, relative to the total number of atoms in the second metal powder. In one embodiment, the second metal powder further includes at least one biocompatible element selected from the group consisting of cobalt, chrome, tantalum, iron, molybdenum, tin, and silicon. The second metal powder is not mechanically alloyed and thus composite metal particles of Ti/Zr/Nb having intermetallic bonds may not be present in the second metal powder. The second metal powder may preferably have a crystallinity of no more than 10 vol %, preferably no more than 5 vol %, preferably no more than 2 vol %, preferably no more than 1 vol %. After the shell is printed with the second metal powder, a crystallinity of the second metal powder may increase by no more than 5 vol %, preferably no more than 3 vol %, preferably no more than 1 vol %, relative to the total volume of the second metal powder. In view of that, the crystallinity of the second metal powder after 3D printing is substantially different than the crystallinity of the first metal powder after 3D printing, because the first metal powder has been mechanically alloyed. Therefore, the crystallinity of the shell is substantially different than the crystallinity of the core.

In a preferred embodiment, printing the shell is substantially the same as printing the core, as described previously. Accordingly, in a first step, the core is placed in the vacuum chamber of the 3D printing machine, and the vacuum chamber is then evacuated to reduce oxygen content to a value below 10 ppm, preferably below 5 ppm, and preferably below 1 ppm. Reducing oxygen content of the vacuum chamber may eliminate a chance of surface oxidation of the shell during 3D printing. In a second step, the energy source, which may be a pulsed laser, a fiber laser, an electron-beam, or a micro-plasma torch, creates a melt pool on the base plate for a deposition of the metal composite. In a third step, the second metal powder is fed into the energy source of the 3D printing machine to melt the second metal powder, and a molten metal powder is further deposited layer-by-layer on the core, which is mounted on the base plate. A movement of the CNC table may be controlled by a computer and the molten metal powder is deposited until the shell with a desired shape and geometries is fabricated on the core. The molten metal powder may be deposited with a deposition rate in the range of 50 to 1,500 g/hr (grams per hour), preferably 100 to 1,000 g/hr, preferably 150 to 500 g/hr. In some embodiments, one or more printing process variables such as the power of the energy source, a feed rate of the second metal powder into the energy source, a speed of the CNC table, and a distance between deposition tracks may vary depending on a desired porosity and a desired elastic modulus of the shell of the metal composite (or the biomaterial). In a preferred embodiment, the porosity of the shell is altered by varying the one or more printing process variables. Preferably, the porosity of the shell may vary in the range of 0.5-15.0 vol %, preferably 5.0-12.0 vol %, preferably 8.0-10.0 vol %, relative to the total volume of the shell. Also, an average pore size present in the shell may be in the range of 1 to 800 μm, preferably 100 to 600 μm, preferably 200 to 500 μm, preferably 300 to 400 μm. Since the shell is in direct contact with a hard tissue, e.g. a bone, therefore the porosity of the shell is selected with respect to the porosity of the hard tissue which is directly adjacent to the shell. Having a porous shell adjacent to a hard tissue may facilitate an osseointegration process of the hard tissue, because the hard tissue may grow into pores of the shell. Additionally, the elastic modulus of the shell may also be altered by controlling the porosity. In a preferred embodiment, the elastic modulus of the shell is substantially the same as the elastic modulus of the hard tissue, which is directly adjacent to the shell, in order to reduce a stress shielding effect and to achieve a uniform stress distribution and an even load transfer to the biomaterial. Thus, in some embodiments, the porosity of the shell is altered such that the elastic modulus of the shell is substantially the same as the elastic modulus of the hard tissue, e.g. a bone, which is directly adjacent to the shell.

The metal composite (or the biomaterial) which is fabricated by the method of the second aspect has a core with a crystallinity of at least 50 vol %, preferably in the range of 60 vol % to 99.9 vol %, more preferably in the range of 70 vol % to about 90 vol %, relative to the total volume of the core; and a shell with a crystallinity of no more than 10 vol %, preferably no more than 5.0 vol %, preferably no more than 1.0 vol %, relative to the total volume of the shell. The shell may have a thickness of no more than 1 cm, preferably in the range from about 0.1 to about 0.9 cm, preferably from about 0.2 to about 0.8 cm, preferably from about 0.3 to about 0.7 cm, preferably from about 0.4 to about 0.6 cm, wherein the shell may cover at least 10%, or at least 20%, or at least 30%, or at least 40%, or at least 50%, or at least 60%, or at least 70%, or at least 80%, or at least 90%, or at least 95%, or at least 99% of the external surface area of the core.

The metal composite (or the biomaterial) which is fabricated by the method of the second aspect may further be coated with a polymer, e.g. an epoxy, an acrylate, a vinyl esters, a polyurethane, etc., and/or may be coated with a coloring dye. In addition, the metal composite (or the biomaterial) may be polished to have a smooth external surface, milled, drilled, laser-machined, and/or annealed at a temperature in the range of 100 to 500° C., preferably 200 to 400° C.

At least a portion of an external surface area of the metal composite (or the biomaterial) may be hardened after a desired shape and geometries is achieved, Preferably, the metal composite is a biomaterial and the surface of the biomaterial which is exposed to a continuous and a larger stress may be hardened to improve a wear resistance of the biomaterial. Accordingly, nanoparticles of a powder material may be momentarily introduced into the melt pool in the presence of a flow of oxygen gas and/or nitrogen gas and a laser beam. The powder material may preferably be selected from the group consisting of titanium dioxide ($TiO_2$), titanium nitride (TiN), titanium carbide (TiC), tantalum pentoxide ($Ta_2O_5$), and tantalum nitride (TaN). Consequently, a portion of an external surface area of the biomaterial, for example, no more than 20%, preferably 2 to 15%, preferably 5 to 10% of the external surface area of the biomaterial, is hardened, wherein a ratio of a Vickers hardness of a hardened surface to a Vickers hardness of a non-hardened surface of the biomaterial is in the range of 2:1 to 20:1, preferably 5:1 to 15:1, preferably about 10:1.

The examples below are intended to further illustrate protocols for the metal composite (or the biomaterial) and the method of fabricating thereof, and are not intended to limit the scope of the claims.

EXAMPLE

A titanium based-alloy for biomedical applications and a method of fabrication with an integrated 3D printing technique with mechanical alloying (MA) was carried out. The alloy was composed of 20% at (atomic percentage) of Niobium (Nb), 13% at of Zirconium (Zr), with the balance being Titanium (Ti). Titanium (Ti), Zirconium (Zr), and Niobium (Nb) met the criteria for biomaterials in terms of biocompatibility, resistance to corrosion, mechanical performance and ionic cytotoxicity. The addition of Niobium (Nb) to Ti provides an alloy with an improved mechanical properties and an improved wear resistance, while the addition of Zr improves the hardness of the alloy.

MA is an effective approach to produce a homogenous alloy in the situations where the alloying components have high-melting temperatures. The fabricated biomaterial was obtained in the following steps:

A mixture of elemental powder of Ti, Nb and Zr was mechanically alloyed to obtain either a crystalline or a partially amorphous alloyed powder. A mixture of elemental powder of Ti, Nb and Zr were mixed in atomic percentage of Ti-20Nb-13Zr to fabricate the required alloy composition. The mixture was then loaded into ceramic vials (which were made of tungsten carbide, alumina, or zirconia) with ceramic balls of the same material, wherein a ball to powder weight ratio was 10:1. A processing control agents (PCA) was not added thereto. The powders were mechanically alloyed (MA) for 10 to 50 hours under argon atmosphere in a planetary ball mill (Fritsch Pulverisett 5) at room temperature at an adequate rotational speed i.e. 300 RPM. The MAed powder was then fed into a 3D printing machine to fabricate the alloy. 3D printing technology provides a biomaterial with any desired shapes. The parameters of the integrated 3D printing process were controlled to fabricate an amorphous mesh outer layer over the core of the fabricated biomaterial, which is either crystalline or partially amorphous.

Since the alloy was developed from non-toxic elements i.e. Ti, Zr, and Nb, the resulting alloy met the criteria to be utilized as a biomaterial. Those criteria include biocompatibility, resistance to corrosion, mechanical performance, and ionic or chemical cytotoxicity. The proposed processing technique for titanium alloys may provide biomaterials with a customized shape, for various biomedical applications.

The invention claimed is:

1. A metal composite, comprising:
a core of a mechanical alloy of titanium, zirconium, and niobium obtained by a 3D printing method; and
a shell of an alloy of titanium, zirconium and niobium obtained by a 3D printing method that covers at least a portion of the core,
wherein
the core mechanical alloy comprises from 10-30% atomic percentage of niobium, from 5-20% atomic percentage of zirconium, and from 60-75% atomic percentage of titanium, relative to the total number of atoms of the core,
the core mechanical alloy is in the form of grains having an average particle size of from 1 to 10 μm,
a porosity of the core is from 0.5 vol % to 2.5 vol %,
the shell alloy comprises from 10-30% atomic percentage of niobium, from 5-20% atomic percentage of zirconium, and from 60-75% atomic percentage of titanium, relative to the total number of atoms of the shell,
a porosity of the shell is from 5.0 vol % to 15 vol %,
a crystallinity of the core determined by X-ray diffraction is in the range of 60 vol % to 99.9 vol % relative to the total volume of the core, and
a crystallinity of the shell determined by X-ray diffraction is no more than 1.0 vol % relative to the total volume of the shell.

2. The metal composite of claim 1, which is biocompatible.

3. The metal composite of claim 1, wherein a thickness of the shell is from 0.05 to 1 cm.

4. The metal composite of claim 1, wherein titanium, zirconium, and niobium are homogenously dispersed in the core, and wherein titanium, zirconium, and niobium are homogenously dispersed in the shell.

5. The metal composite of claim 1, wherein the core further comprises at least one ceramic material selected from the group consisting of titanium nitride (TiN), titanium carbide (TiC), zirconia, silica, silicon carbide, silicon nitride, alumina, aluminum nitride, aluminum titanate, and tungsten carbide, and wherein the shell further comprises one or more of titanium oxide, zirconia, and niobium oxide.

6. The metal composite of claim 1, which has at least one of the following properties, an elastic modulus of the core that is at least 50% higher than the elastic modulus of the shell, a hardness of the core that is at least 50% higher than the hardness of the shell, and a ductility of the shell that is at least 50% higher than the ductility of the core.

7. The metal composite of claim 1 wherein the core mechanical alloy consists of niobium, zirconium, and titanium, and the shell alloy consists of niobium, zirconium and titanium.

8. The metal composite of claim 1, wherein the core mechanical alloy consists of 20 atomic % niobium, 13 atomic % zirconium and titanium, and the shell alloy consists of 20 atomic % niobium, 13 atomic % zirconium and titanium.

9. The metal composite of claim 1 wherein a relative density of the core is from 95% to 98% and a relative density of the shell is from 85% to 92%.

10. A method of fabricating the metal composite of claim 1, comprising:

mechanically alloying a first metal powder comprising titanium, niobium, and zirconium to form a printing precursor powder;

feeding the printing precursor powder into a 3D printing machine and printing the core of the metal composite; and feeding a second metal precursor comprising titanium, niobium, and zirconium into the 3D printing machine and printing the shell that covers at least a portion of the core thereby fabricating the metal composite.

11. The method of claim 10, wherein the first metal powder is mechanically alloyed under an inert atmosphere.

12. The method of claim 10, wherein the first metal powder is mechanically alloyed in a planetary ball mill at a temperature of 10 to 40° C. for 5 to 60 hours at a rotational speed of 100 to 600 RPM.

13. The method of claim 12, wherein the planetary hall mill comprises ceramic vials and ceramic balls of at least one ceramic material selected from the group consisting of tungsten carbide, alumina, and zirconia.

* * * * *